Dec. 23, 1969 G. H. HALSEY 3,485,271
PROTECTOR FOR CASINGS, PIPES AND OTHER CYLINDRICAL OBJECTS
Filed Sept. 30, 1966 8 Sheets-Sheet 1

INVENTOR
George H. Halsey
BY
ATTORNEYS

INVENTOR
George H. Halsey

INVENTOR
George H. Halsey
BY
ATTORNEYS

Dec. 23, 1969  G. H. HALSEY  3,485,271
PROTECTOR FOR CASINGS, PIPES AND OTHER CYLINDRICAL OBJECTS
Filed Sept. 30, 1966  8 Sheets-Sheet 4

INVENTOR
George H. Halsey
BY
*Hoopes, Leonard & Buell*
ATTORNEYS

Dec. 23, 1969  G. H. HALSEY  3,485,271
PROTECTOR FOR CASINGS, PIPES AND OTHER CYLINDRICAL OBJECTS
Filed Sept. 30, 1966  8 Sheets-Sheet 5

INVENTOR
George H. Halsey
BY
ATTORNEYS

INVENTOR
George H. Halsey
BY
ATTORNEYS

Dec. 23, 1969   G. H. HALSEY   3,485,271
PROTECTOR FOR CASINGS, PIPES AND OTHER CYLINDRICAL OBJECTS
Filed Sept. 30, 1966   8 Sheets-Sheet 7

INVENTOR
George H. Halsey
BY
*Hoges, Leonard & Buell*
ATTORNEYS

United States Patent Office 3,485,271
Patented Dec. 23, 1969

3,485,271
PROTECTOR FOR CASINGS, PIPES AND OTHER
CYLINDRICAL OBJECTS
George H. Halsey, Indiana, Pa., assignor to McCreary
Tire & Rubber Company, Indiana, Pa., a corporation
of Pennsylvania
Filed Sept. 30, 1966, Ser. No. 583,364
Int. Cl. F16l 57/00; B65d 59/00, 59/06
U.S. Cl. 138—96                                         22 Claims

ABSTRACT OF THE DISCLOSURE

A protector for casings, pipes and collars, shafts and other cylindrical objects of either solid or hollow configurations, and more particularly to a continuous band type protector which can be easily installed and removed from either the end or midportion of the cylindrical object and which is capable of being reused many times under conditions of rough usage or abuse imparted to the cylindrical object. More specifically, the protector is arranged for fitting over the end of a relatively large and heavy cylindrical object having external threads or other machined connecting surface to protect the machined ends during use or other manipulation thereof and particularly during those times when the cylindrical object may be stood or dragged on one end thereof.

In the ensuing description of the invention, novel forms of my protector will be described primarily in connection with usage on the lower thread end of a section of oil or gas well casing during handling thereof which usually involves dragging the lower end of the casing along a walk or the like leading to the well prior to introducing the casing section into the well. It will be understood as this description proceeds, however, that the protector can be used in related applications such as in connection with drill pipes or collars, and in unrelated applications as in large pipe sections for various types of large diameter pipe lines or in protecting the journaled ends of large roll shafts or the like during transportation or installation thereof.

In drilling wells of the character described, the well casing sections are successively connected to a cable or hoist from the derrick over the well and the hoist is employed to drag the casing sections in a more or less horizontal position to the well and then to lift and tilt the sections to a vertical position over the well opening. Some means must therefore be provided to protect the threads on the casing end which is dragged or the threads thereon will be severely damaged. Because of the weight of the casing and the abuse to which it is thus subjected, such protection means must be much more rugged and resilient than the protectors usually applied during shipment of the casement sections to the field. Moreover, such protectors become jammed when subjected to the usual abuse and cannot be easily removed.

Numerous forms of protectors have been previously proposed for well drilling operations. These conventional protectors have suffered from the disadvantages of not being sufficiently rugged to offer adequate thread protection in many applications, of not being reuseable, of requiring an excessive amount of time for application and removal before the casing section can be lowered into the well, of not being sufficiently resilient or otherwise having projecting operating handles or other rigid parts which are easily broken, and in most cases of having such rigidity as to cause severe injury in the event that an operator is inadvertently struck by the protector.

Resilient protectors have been proposed previously. For example, there are inflatable thread protectors for this purpose, which however present the added disadvantages of high initial costs and short life. Additionally air pressure sources must be provided together with added operating personnel for manipulating this type of thread protector. Other resilient protectors have been proposed which, however, have required various reinforcing bands imbedded in or otherwise secured to the protector which greatly diminishes the protection to the casing and the reliability thereof. In addition elaborate clamping and unclamping mechanisms are required which are hazardous in operation and require considerable maintenance and which are otherwise unreliable owing to the use of complicated structures and large numbers of parts.

I overcome these problems and difficulties by providing a rugged, resilient protector of the character described and having no moving parts and no exposed operating hardware of any kind. My novel thread protector thus comprises a sleeve of structural resilient or elastomeric material depending upon the application of the invention, which is so shaped that it can be quickly and easily installed on and removed from the end of the casing section simply by slipping the thread protector thereover. However, means are formed integrally with the band member or otherwise installed thereon which causes the protector to bind against the wall of the casing or other cylindrical object, for example as the casing with the protector thereon is being dragged to the well opening, or when other removal forces are otherwise applied to the protector. After such withdrawal forces are removed, however, the protector either returns naturally or is easily returned as by light tapping to an unbound configuration or disposition on the well casing for facile removal. In certain arrangements of my protector an integral dust seal or shield is provided and in certain forms thereof is arranged to aid in retaining inserting the protector on the casing. In still other arrangements of my novel protector, the band member thereof is shaped for a canting and binding or cocking action when the casing section is dragged or tilted which binds the band member against the adjacent wall portions of the casing. In still other arrangements means provided on the interior wall of the band member are brought into engagement with the machined surface such as threads of the casing section to bind the protector against the casing threads, also.

In the foregoing discussion various objects, features and advantages of the invention have been alluded to. These and other objects, features and advantages of the invention will be elaborated upon as the forthcoming description of presently preferred embodiments thereof and presently preferred methods of practicing the same proceeds.

In the accompanying drawings I have shown presently preferred embodiments of the invention and have illustrated presently preferred methods of practicing the same wherein.

Figure 1:
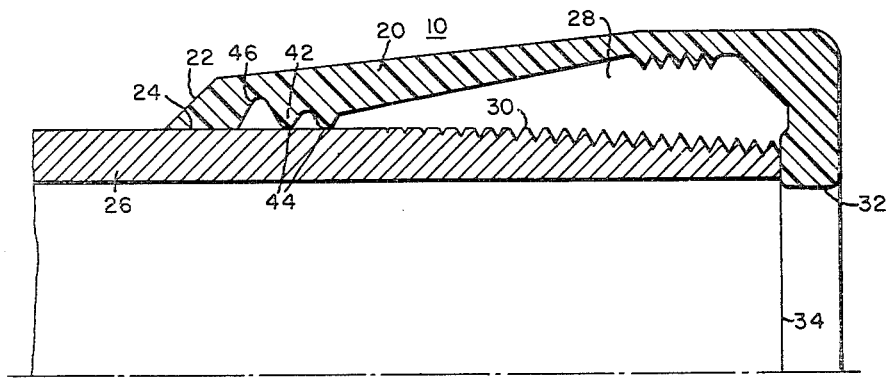
FIGURE 1 is a partial, longitudinally sectioned view of one form of my protector illustrated here in an unloaded position upon a well casing section.
Figure 2:
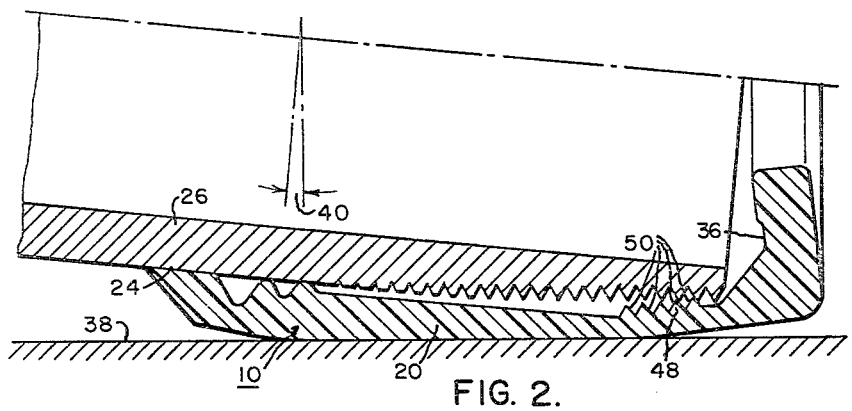
FIGURE 2 is a similar view of the protector as shown in FIGURE 1 but illustrating the protector in a partially loaded position on the casing section.
Figure 3:
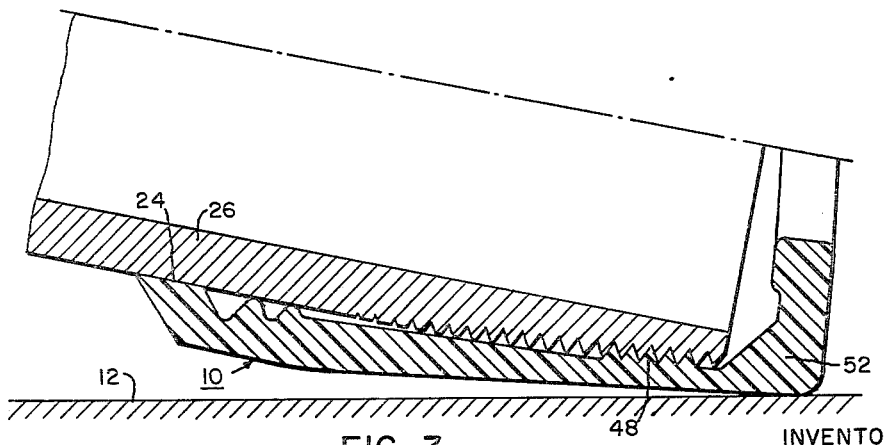
FIGURE 3 is a similar view of the protector as shown in FIGURES 1 and 2 but illustrating thread engaging means of the protector in a fully loaded position.

Referring now more particularly to FIGURES 1–3 of the drawings, the exemplary form of the invention illustrated therein includes a band member 20 having in this example a chamfered portion 22 extending about the inward lateral edge thereof, which tapers to a dust-sealing lip 24. Desirably the inner diameter of the sealing lip 24 is made the same size or slightly smaller than the outer diameter of the well casing 26 on which the protector is being used and the latter is tapped on by hand or with a suitable mallet. It is contemplated however that the inner diameter can be slightly larger, depending on the application of the invention and the rigidity of the material, to facilitate installation and removal of the protector.

The remainder of the continuous band member in this arrangement flares outwardly to the other lateral edge portion of the band member to provide a canting or cocking space 28 between the inner periphery of the inner band member and the outer periphery including threads 30 of the casing section 26. At the aforementioned other lateral edge of the band member an inwardly extending relatively heavy protective lip or shoulder 32 is joined to the band member 20, in this example in an integral fashion, to protect the end edges 34 of the casing section. In this form of the invention the inner diameter of the shoulder 32 is about equal to the inner casing diameter.

Outwardly of the casing section 26 the end shoulder or wall portion 32 of the band member 20 is provided on its inner surface with a circumferential recess 36 into which the lower edge 34 of the casing section 26 tends to seat as the casing section is being raised to its vertical position and the weight thereof is increasingly transferred toward the protective shoulder 32 of the band member 20.

As better shown in FIGURE 2, the other end (not shown) of the casing section 26 is raised slightly by the hoist or derrick (not shown) to drag the casing section with the protector thereon along the floor or walkway 38 leading to the well opening. The canting space 28 and the weight of the casing section 26 upon the band member 20 causes the band member to be cocked or canted on the casing section at a suitable angle 40. This cocking action causes the band member 20 to bind to a greater or lesser extent against the adjacent outer wall portion of the casing 26 at its sealing lip 24 as explained below in connection with FIGURE 17. Additional binding action is afforded by an inwardly extending circumferential projection 42 formed in this example integrally with the band member 20 and disposed adjacent the inward extremity of the casing threads 30. This arrangement binds the band member 20 to the casing section 26 at circumferential areas corresponding in this example to the seal 24 and the circumferential projection or ring 42. As the drag of the thread protector on the floor or walkway 38 increases this canting and binding action of the seal 24 and the projection 42 likewise increase. Shock-loads occasioned by the band member 20 striking irregular places on the catwalk tend to increase further this binding action and further secure the protector on the casing during the low angle horizontal pull of the casing along the catwalk 38 in the initial stages of moving and raising the casing to the derrick floor (not shown).

Although the circumferential projection 42 is shown here with two ridges 44 to increase the frictional engagement it will be understood that the number of ridges 44 can be varied depending upon the particular application of the thread protector. Moreover, additional projections similar to the projection 42 can be employed as described below.

Desirably, a circumferential groove 46 is provided between the sealing lip 24 and the circumferential projection 42 to permit a circumferential hinging action in this area of the band member 20 as the latter is flexed or cocked on the casing section when load is applied to the protector. The bottom areas as viewed in FIGURES 2 and 3, of the sealing lip 24, the circumferential projection 42 and circumferential thread engaging means 48 serve as leverage points to effect cocking of the band member 20 when the protector is loaded as aforesaid.

The aforementioned thread engaging means 48 extend circumferentially about the inner periphery of the band member 20 and are disposed adjacent the protective shoulder 32 thereof so as to engage the threaded portion 30 of the casing section when the protector is canted thereagainst. To increase frictional engagement between the thread engaging means 48 and the casing threads a number of circumferential ridges 50 can be replaced by a thread engaging means having complementary pitch and spacing relative to the casing threads.

As better shown in FIGURE 2 if the casing section is being dragged substantially horizontally the thread engaging means 48 are relatively lightly loaded. However, as the casing 26 is tilted further to substantially the position shown in FIGURE 3 the thread engaging means 48 are fully loaded. This action compresses the resilient thread engaging means 48 and increases the locking engagement of the band member 20 on the end portion of the casing 26 as additional weight is transferred to the lower end of the casing section 26, as evident from a comparison of FIGURES 2 and 3. As the casing section 26 is raised still further toward its vertical position (not shown) the weight of the casing section is increasingly transferred to the lower end portion 52 (FIGURE 3) of the band member 20.

Figure 4:
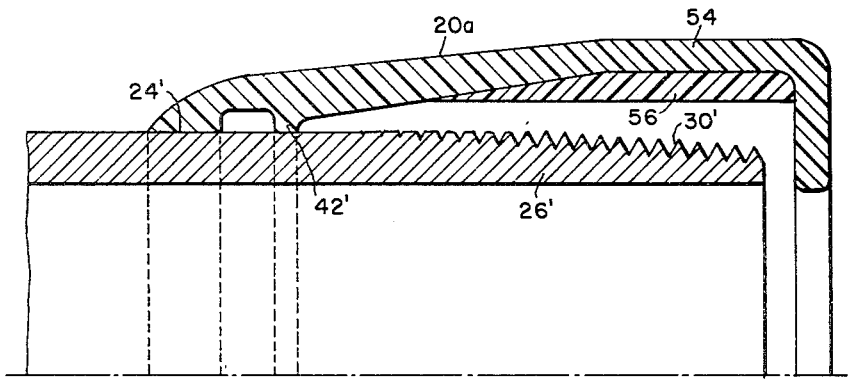
FIGURE 4 is a partial, longitudinally sectioned view of another form of the protector of my invention wherein the band member is formed from a composite resilient material.

Referring now to FIGURE 4 of the drawings the novel protector shown therein includes a modified continuous band member 20a wherein the major and outer proportion 54 thereof is fabricated from a relatively harder resilient or elastomeric material for example Shore D 75 polyurethane elastomer. On the other hand that portion 56 of the band member 20a adjacent the casing threads 30' is fabricated from a relatively softer resilient material for example Shore A 85 polyurethane elastomer, which when forceably engaged by the casing threads 30' permits the threads to dig into the softer resilient material 56 when loads are applied to the thread protector to bind securely the band member 20a on the casing section 26'. On the other hand, greater binding action is provided where needed by the relatively harder sealing lip 24' and binding projection 42'.

Figure 5:
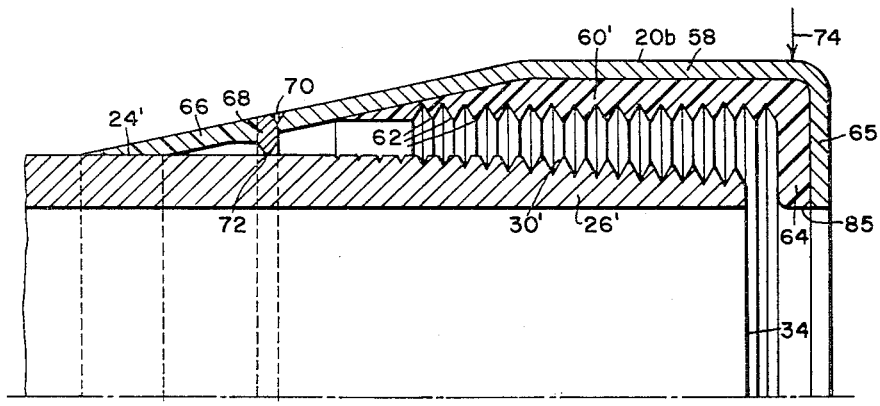
FIGURE 5 is a partial, longitudinally sectioned view of still another form of my invention wherein the band member is formed from composite structural and resilient materials.

Referring now to FIGURE 5 of the drawings another form of a continuous, composite band member 20b is shown therein. In this latter arrangement the major proportion of the harder band portion 54 (FIGURE 4) is replaced by an outer sleeve 58 fabricated from a suitable structural material such as mild steel. The thread engaging means includes an inner sleeve 60 of relatively soft elastomeric material such as Shore A polyurethane which is bonded to the inner surface of the outer sleeve 58 by application of a suitable bonding agent, such as that sold under the name of "Thixon" by Dayton Chemical Products Labs., Inc., West Alexandria, Ohio.

If desired, the inner periphery of the inner sleeve 60 adjacent the casing threads 30' can be circumferentially ridged or threaded as denoted by reference character 62 to increase the frictional engagement of the resilient inner sleeve 60 with the casing threads when the composite band member is canted upon the casing section 26' in the manner described above. In this arrangement the inner sleeve 60 preferably is provided with an inwardly extending shoulder or lip portion 64 at the adjacent lateral edge of the band member 20b for engagement with the adjacent end 34' of the casing section. The elastomeric shoulder 64 is backed up by a contiguous shoulder 65 formed integrally with or otherwise secured to the structural sleeve 58.

To permit the canting action of the composite sleeve 20b a circumferential resilient band portion 66 is bonded to the other lateral edge of the outer sleeve 58 in the manner described above. In this arrangement the band portion 66 desirably is fabricated from a resilient or elastomeric material of intermediate hardness for example Shore A 95 polyurethane so as to provide a circumferential hinge area which permits angular displacement or cocking of the composite band 20b upon the casing section 26'. The flexible band portion 66 desirably is provided with a dust seal 24' which is similar to the dust seal 24 of FIGURES 1–3 and which can be employed in this example to provide binding action upon the adjacent outer wall surface of the casing.

However, in this arrangement the band member 20b desirably is locked or bound upon the casing section by a circumferentially extending washer 68 which is fabricated from a suitable structural material, for example hardened or tool steel. The washer 68 can be rigidly joined to the adjacent lateral edge of the outer sleeve 58, for example by welding as indicated by reference character 70. Thus, when the band member 20b including the relatively rigid sleeve 58 is cocked by dragging or unequal loads applied to the band member 20b, the washer 68 is likewise cocked or canted to provide a severe frictional engagement between the washer 68 and the adjacent surface of the casing section. In furtherance of this purpose the inner periphery of the washer 68 can be provided with a knife edge 72 or the like, if desired. Additional binding action is provided by engagement of the casing threads 30' with the ridges 62 of the resilient inner sleeve member 60, or in the absence of the ridges 62 by digging of the casing threads 30' into the relatively soft resilient material comprising the inner sleeve 60. The band member 20b of FIGURE 5 can be removed by tapping the outer sleeve member 58 thereof as denoted by arrow 74 to restore the band member 20b to its coaxial position on the casing section 26' whereupon the protector is readily removed by virtue of the clearances provided for this purpose between the sealing lip 24' and the washer 68 on the one hand and the adjacent casing surfaces.

Figure 6:
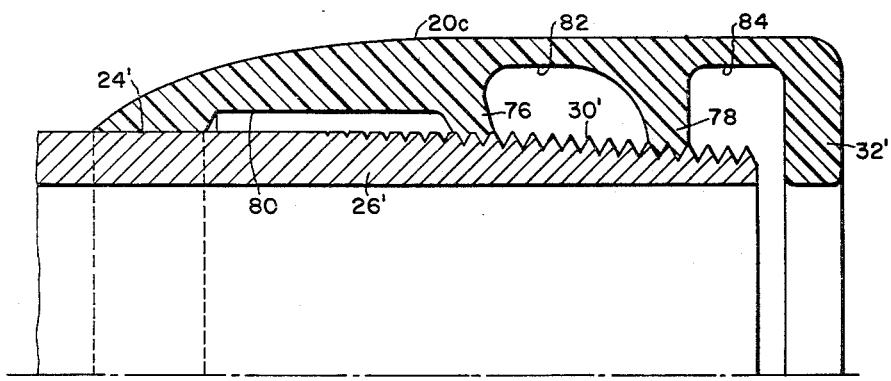
FIGURE 6 is a partial, longitudinally sectioned view of still another form of my protector wherein a plurality of spaced thread engaging means are supported upon the inner periphery thereof.

Referring now to FIGURE 6 of the drawings another modified form of the band member 20b is disclosed therein. In the latter arrangement of the invention the band member 20' is provided with dust seal lip 24' as described previously and with a plurality of spaced circumferential projections, for example the projections 76 and 78 disposed for engaging the casing threads 30'. In this arrangement, however, the thread engaging projections 76 and 78 are made with only slightly larger diameters, as is the dust seal 24', than the adjacent outer diameters of the casing section so that the band member 20c initially is substantially centered or disposed coaxially on the casing section 26'. The band member 20c is fabricated together with the projections 76 and 78 which in this example are formed integrally therewith from a resilient or elastomeric material ranging from relatively soft to relatively hard. Thus, when loads are applied to the band member 20c of FIGURE 6, in the manner described above, the projections 76 and 78 are variably depressed depending upon the particular area of load application at the lower side of the band member 20c. This action permits the various projections of the band member 20c to be cocked relative to the casing section depending again on the area of load application. This cocking of various projections of the band member 20c causes either one or both of the projections 76 and 78 and the seal lip 24' to bind upon the adjacent wall surfaces of the casing section. This segmental cocking action of the band member 20c is facilitated by grooves or recesses 80, 82 and 84 formed on the inner periphery of the band member 20c and respectively between the sealing lip 24', the circumferential thread engaging projections 76, 78 and the protective shoulder 32'.

Figure 7A:
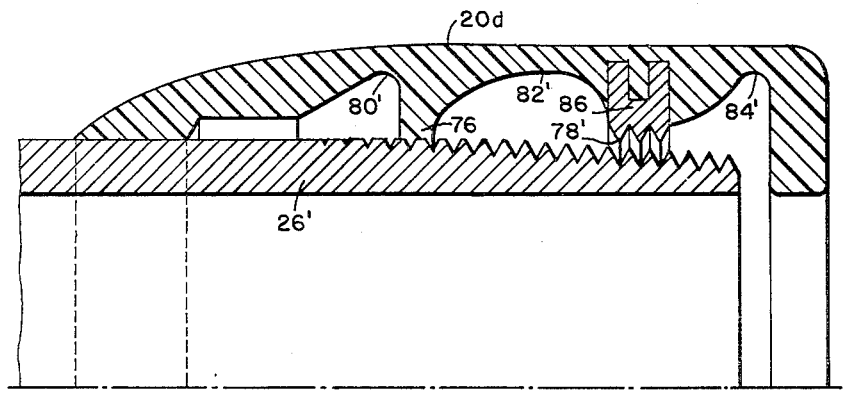
FIGURES 7A and 7B are partial longitudinally sectioned views showing modified arrangements of the aforementioned engaging means.

A similar arrangement of the band member 20d is seen in FIGURE 7A of the drawings wherein means are provided for reinforcing the thread engaging projections 78' to which the greatest loads are applied as the casing section 26' is raised to its vertical position. In the latter arrangement of the invention the projection 78' is reinforced by a washer 86 fabricated from a hard resilient material such as Shore D 75 polyurethane or from a suitable structural material such as aluminum mild steel. The washer 86 is spaced outwardly of the casing 26' to facilitate canting of the band member 20d and is secured to the inner periphery of the band member 20d, for example, by being impartially imbedded therein. The canting action of the band member of FIGURE 7A is similar to that of FIGURE 6 with the exception that grooves 80' and 82' are made correspondingly deeper to promote the aforesaid canting action in the area of the projections 76', 78'.

Figure 7B:
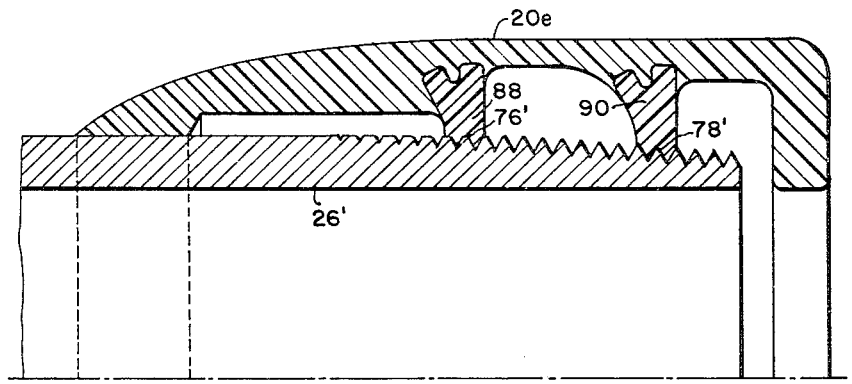

The resilient band member 20e of FIGURE 7B likewise is similar to that of FIGURE 6, with the exception that both of the thread-engaging projections 76', 78' are provided with reinforcing washers 88 and 90 of relatively harder material such as one of those mentioned in connection with the washer 86 of FIGURE 7A.

Figure 8:
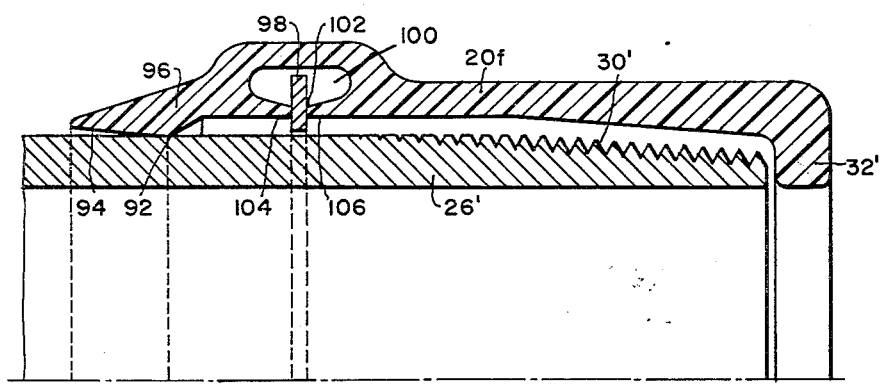
FIGURE 8 is a partial, longitudinally sectioned view of still another form of my protector wherein the resilient band member thereof is provided with a binding or locking member formed from a relatively hard or structural material.

Referring now to FIGURE 8 of the drawings another exemplary arrangement of my protector is illustrated therein and includes a modified band member 20f. In this arrangement of the invention the band member 20f is fabricated from a relatively soft resilient or elastomeric material such as polyurethane elastomer having a hardness in the range of Shore D 70–85 to facilitate installation and removal of the band member 20f. An antifrictional additive, for example pulverulent graphite or "Molykote," is incorporated into the resilient material from which the band member 20f is formed to further facilitate such installation and removal. The major proportion of the band member 20f is provided with an inner periphery which is spaced with considerable clearance outwardly of the adjacent portions of the casing section 26'. In this example, the inner periphery of the band member 20f is tapered inwardly toward the lower lateral edge of the band member so as to follow the normal taper of the casing threads 30'. At the lower lateral edge of the band member 20f as viewed in FIGURE 8 of the drawings, a casing edge protective shoulder 32' is integrally molded therewith in this example.

Adjacent the other lateral edge of the band member 20f a sealing lip 92 is disposed and can be provided with the same or smaller inner diameter as the outer diameter of the casing, as set forth previously in connection with the sealing lip or ring 24 or 24' of the preceding figures. In this arrangement, however, the lip 92 tapers outwardly to the adjacent lateral edge of the band member 20f as denoted by reference character 94, in order to facilitate insertion of the end of the casing section into the protector.

When the casing section 26' is dragged as set forth above, binding action of the protector thereon is afforded by the sealing lip 92 and by engagement and temporary imbedment of the pipe threads 30' into the relatively soft inner wall portions of the band member 20f. In furtherance of this purpose when loads are applied to the band member 20f the latter flexes slightly about the necked down circumferential portion 96 to permit the slight cocking of the remainder of the band member 20f and the aforementioned frictional engagement with the casing threads 30'.

However, when the band member 20f is thus cocked or when portions thereof tend to be longitudinally displaced as when dragging loads are applied to one side thereof, means are further provided in accordance with the invention to provide additional binding or locking action for the protector. One form of such locking means includes a relatively thin washer 98 which is fabricated from a suitable structural material such as hard steel. The inner periphery of the washer 98 is closely spaced relative to the adjacent outer periphery of the casing section 26', with sufficient clearance to permit slippage over the casing section when the protector is disposed coaxially thereof. In this example the washer 98 is retained within a circumferentially extending washer chamber 100 formed in the band member 20f and opening at reference character 102 into the inner periphery thereof. With this arrangement the application of even slight loads to the side of the thread protector or even the weight of the protector itself when the casing section is in other than the vertical position will cause the washer 98 to cock or cant and bind on the adjacent wall of the casing. The chamber 100 into which the washer 98 is inserted provides sufficient room for cocking movements of the washer 98.

When the casing section has been raised to its vertical position and it is desired to remove the protector a pair of opposed circumferential lugs 104 and 106 are provided in engagement with the washer 98 to return the washer to its normal or uncocked position upon removal of unequal loads from the protector. The lugs 104 and 106 in this arrangement are desirably molded integrally with the band member 20f and thus are sufficiently resilient for the purpose intended when the protector is fabricated from an elastomeric or other resilient material. The opening into the washer chamber 100 through which the washer 98 is inserted when assembling the protector, is defined by the lugs 104, 106.

Figure 9:
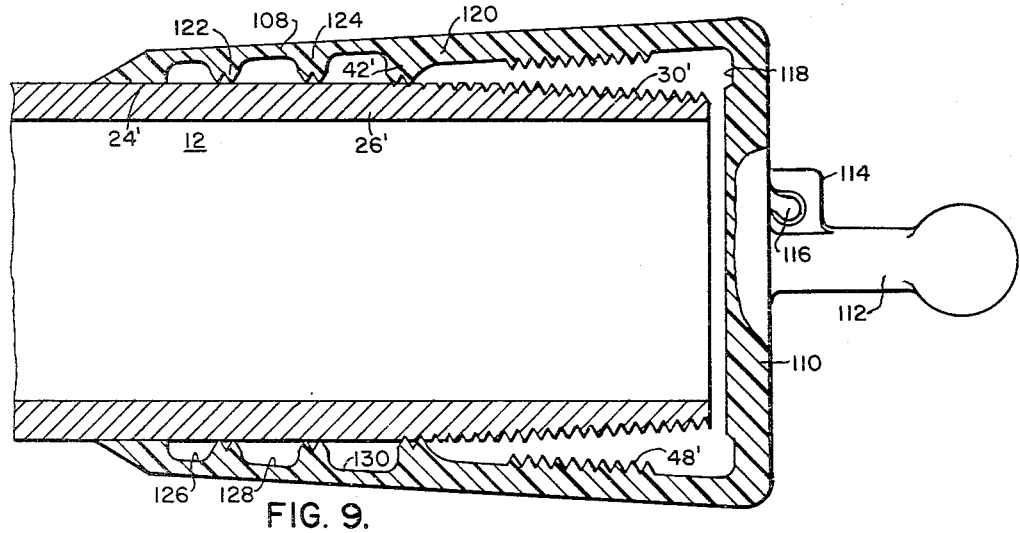
FIGURE 9 is a longitudinally sectioned view of still another form of my protector which is provided here with a handle member and with wire return engaging means for facilitating the installation and removal of the protector.
Figure 10:
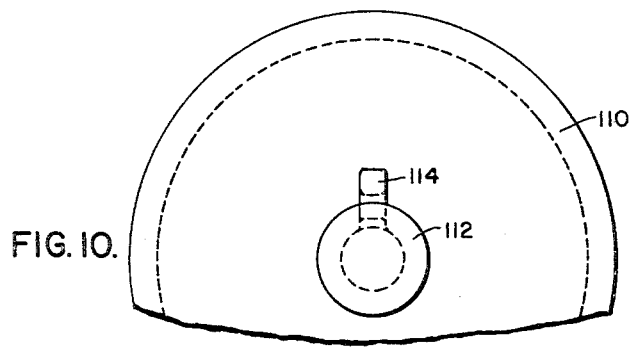
FIGURE 10 is a partial end elevational view of the protector shown in FIGURE 9.

Referring now to FIGURES 9 and 10 of the drawings, a further modification of my protector is illustrated therein. In this arrangement of the invention, the protector 108 is of generally cup-shaped configuration with the bottom wall 110 of the protector being provided with a suitable handle 112 to facilitate handling during installation and removal of the protector 108. In this arrangement of the invention the handle 112 desirably is secured coaxially of the discoidal bottom wall member 110, and the thread protector 108 including the handle 112 can be molded integrally from a resilient or elastomeric material of suitable hardness. Such arrangement eliminates the use of relatively hard projecting components which can cause severe injury in the event of accidental contact with the thread projector. Adjacent the junction of the handle 112 a notch-defining member 114, in this example, is likewise integrally molded which defines a return wire engaging opening or notch 116 for use when removing the protector. The adjacent inner peripheral surface and recess 118 of the wall member 110 perform the edge engaging functions of the protective shoulder 32 or 32' and recess 36 or 36' of the preceding figures.

The protector 108 is provided with a circumferential dust seal 24' and is otherwise generally shaped for slipping on and subsequent cocking action relative to the casing section 26' substantially in the manner set forth in connection with FIGURES 1–3 of the drawings. In this embodiment of the invention the band portion of the thread protector 108 is correspondingly wider such that the circumferential projection 42' which is disposed generally at the inward extremity of the casing threads 30' is located intermediate the lateral edges of the frusto-conical wall section 120 of the thread protector. Thus, the projection means 42' are further removed from the dust seal 24', and in this example, additional circumferential projections 122 and 124 are formed therebetween. The three projections 42', 122 and 124 together with the dust seal 24' provide areas of binding action against the adjacent wall surface of the casing 26' as described in connection with the seal 24 and projection 42 of FIGURES 1–3. Such binding action occurs when load is applied to the protector 108 on one side of its frusto-conical wall 120, as by dragging the casing section 26' with the protector thereon. Such binding action is caused by cocking of the frusto-conical wall 120 and in furtherance of this purpose circumferential grooves 126, 128 and 130 are provided between the dust seal 24' and the circumferential projections 42', 122, 124, respectively. The recesses 126–130 facilitate flexure or hinging of the wall or band 120 in these areas to facilitate canting thereof and also permit differing degrees of canting at the projections 42', 122, 124 as required by the character and location of applied loads. The aforementioned canting action of the thread protector 108 also brings an area of the inner threaded or circumferentially ridged portion 48' of the frusto-conical wall 120 into engagement with the casing threads 30' to aid further in binding or locking the protector 108 upon the casing section 26'.

Figure 11:
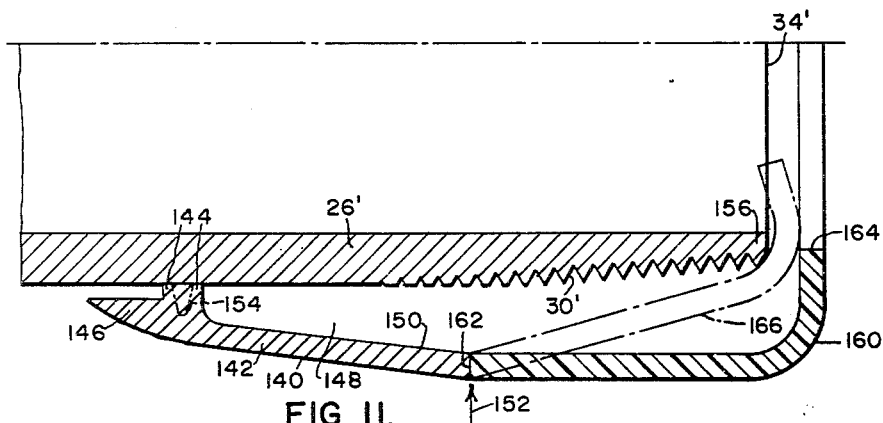
FIGURE 11 is a partial, longitudinally sectioned view of still another form of my protector and illustrating still further the operating principle of my invention.

Another form of my protector 140 is shown in FIGURE 11 of the drawings. The protector 140 in this arrangement includes a relatively rigid, continuous band 142, which in this example can be constructed from an appropriate structural material such as steel, aluminum or the like. The band 142 includes a cantable member 144, a dust shield 146 and an outwardly flaring or bell portion 148, all of which desirably are fabricated integrally. Inasmuch as the cantable member 144, which extends circumferentially about the band 140 along with the dust shield 146 and the belled portion 148, engages the casing 26' above the threaded area 30' thereof it is not necessary to fabricate the band member 140 from a relatively softer material to prevent damage to the threads 30'.

Owing to the rigidity of the band member 140 including the cantable member 144, the band member cannot be canted sufficiently on the casing 26' for the inner surface 150 of bell portion 148 to engage the adjacent threads 30' as the casing 26' is dragged along the catwalk or the like. Accordingly, the band member 140 is made sufficiently strong to bear the total weight of the adjacent portions of the casing 26' at the outer or flared end of the band 142, as denoted by arrow 152.

The band member 140 thus functions in its binding action as described in connection with the preceding figures with the exception that the lower inner surface 150 thereof does not engage the pipe threads 30'. The cantable member or means 144 can be provided as shown; or, alternatively, it can be provided with a knife edge similar to that shown in FIGURE 5; or, alternatively again, a pair of relatively closely spaced ring members can be defined in the general area of the cantable member 144 by providing a circumferentially extending groove or recess, as indicated by chain outline 154, in the inward face of the member 144.

To protect the casing threads 30' when the casing is raised to an intermediate position such that the lower end 156 thereof contacts the catwalk or the floor area as denoted by reference line 158 additional means are provided for protecting that portion of the threads 30' adjacent the casing end 156 but outwardly of the flared band 140. In this arrangement of the invention such further protective means includes a relatively soft band or collar 160, one end of which is joined to the rigid band 140 as denoted by reference character 162. Desirably, the band or collar 160 is fabricated from a relatively soft polyurethane elastomer such as Shore A 75. Alternatively, natural rubber or a neoprene elastomer or similar material can be employed.

The flexible band 160 desirably is provided with a constricted outer opening 164 to protect further the end edges 34' of the casing. Alternatively, the band 160 can be completely closed at an end wall portion (not shown) in the area of the opening 164 so that the member 160 is generally in the form of a bag covering the entire exposed threaded end of the casing 26'. When the casing 26' is raised to the position denoted by reference line 156, the band or bag 160 flexes generally to the position denoted by partial-outline 166 thereof. The thickness of the band 160 is such that, together with the resiliency of the material from which it is fabricated, the lower end portion of 156 of the casing does not cut through relatively flexible band 160 to damage either the band 160 or the adjacent portion of the threads 30'. Alternatively, the relatively rigid band member 140 can be fabricated from a hard plastic material such as a polyurethane elastomer having a hardness of Shore D 60 or greater. It is also contemplated that the flared band 140 can be extended (not shown) so as to cover the adjacent end of the casing 26' and that the collar 166 can then be omitted.

Figure 13:
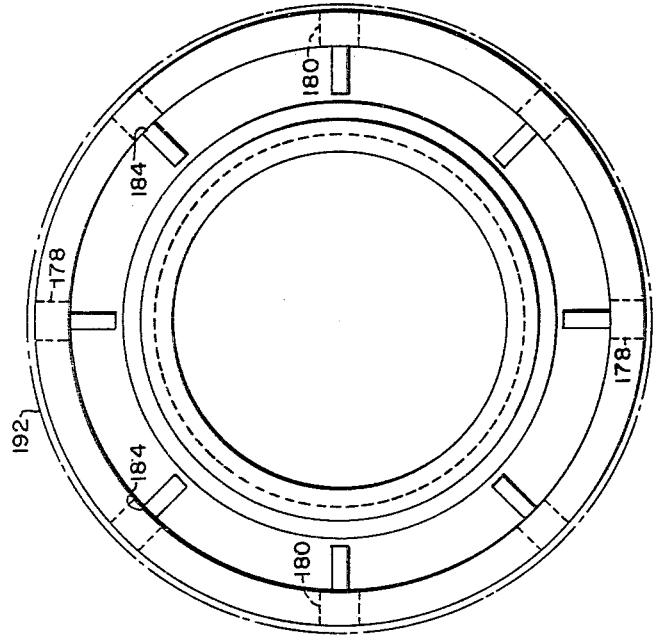
FIGURE 13 is an end elevational view of the protector as shown in FIGURE 12.
Figure 12:
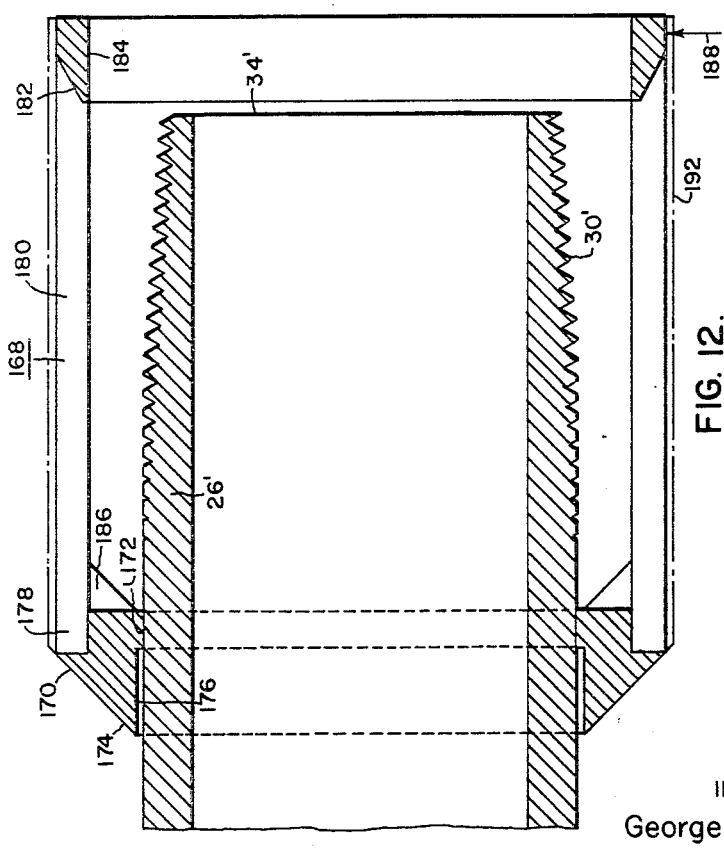
FIGURE 12 is a longitudinally sectioned view of a further arrangement of the protector and illustrating still further the operating principles of the invention.

In FIGURES 12 and 13 another form of my thread protector is disclosed, which exhibits somewhat similar principles of operation. Thus, the protector 168 includes a cantable member in the form of a continuous band 170 having an inwardly and circumferentially extending ring or shoulder portion 172. As in the case of the cantable ring 144 of FIGURE 11 the ring 172 is closely fitted about the outer wall surface of the casing 26'. The ring 172 likewise can be provided with a knife edge (not shown) or with a pair of spaced annular bearing surfaces (not shown) as noted in connection with the ring 144 and the groove 154 of FIGURE 11. The cantable member 170 terminates in a dust shield 174 the inner periphery 176 of which is spaced a slight distance outwardly of the casing surface to permit canting of the member 170, as is the case of dust shield 146 (FIGURE 11).

Depending upon the application of the invention, the member 170 can be fabricated from a suitable structural material such as steel, aluminum, or a hard and tough plastic material. It is also contemplated that the member 170 (FIGURES 12 and 13) or the member 142 (FIGURE 11) alternatively can be fabricated from a reinforced fiber glass. As better shown in FIGURE 13, a plurality of notches 178 are formed in the outer periphery of the band member 170 and circumferentially spaced thereabout. A like number of bar members 180 have their forward ends inserted respectively into the notches 178 where they are rigidly secured as by welding. The rearward ends of the bars 180 are similarly joined to the chamfered leading edge 182 of the retaining ring 184. The bars 180 and the ring 184 thus form an open-ended cage structure which is rigidly joined to the band member 170, as aforesaid. Desirably, the junction of each bar member 180 with the band member 170 is reinforced by an associated gusset 186.

With this arrangement the band member 170 can be canted relative to the casing wall to cause the ring member 172 to bind thereon. Canting of the bar member 170 is effected in this application of the invention by a transverse force applied to the cage 180-184 as denoted by arrow 188, when the front end (not shown) of the casing is lifted and the casing is dragged to the well. As the casing 26' is dragged and increasingly raised to its vertical position the weight of the casing is increasingly shifted to the cage ring 184. This shift in weight along the length of the cage 180-184 causes increasing canting forces to be applied to the member 170 to increasingly bind the protector 168 on the casing in the manner described previously.

Desirably, the cage 180-184 is made sufficiently rigid that the bars 180 are not displaced against the casing threads 30'. The outward chamfer 182 of the cage ring 184 and also the frusto-conical section 190 of the band member 170 prevent the band member 170 and the cage ring 184 from hanging up on irregularities on the catwalk surface or the like.

In those applications wherein the casing 26' or the like is manipulated in rather dusty environments, the cage bars 180 can be covered with a relatively thin circumferentially extending shield 192, fabricated from sheet steel or the like. Alternatively, in applications of severe abuse in handling the casing 26' or wherein the latter is very heavy, the bars 180 and cage ring 184 can be replaced with a continuous tubular section (not shown), such as a section of heavy-walled pipe or the like, which can be secured to an offset surface or groove (not shown) defined by the array of notches 178. In any event, cage 180-184, or the aforementioned continuous tubular section or band if used, is extended rearwardly of the casing end 34' to prevent damage to the end of the casing or to the threads thereon.

Figure 14:
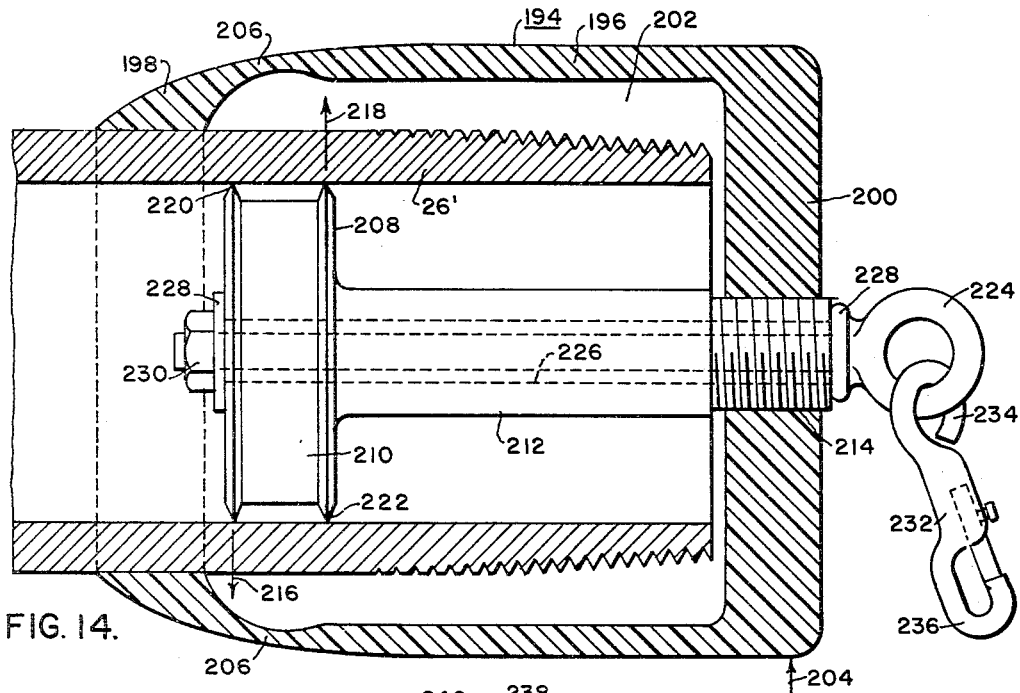
FIGURE 14 is a longitudinally sectioned view of yet another form of my protector and particularly adapted in this form of the invention for engaging the inner periphery of a hollow cylindrical member.

Referring now to FIGURE 14, another form 194 of my protector is disclosed which has means incorporated therewith for inducing a binding action against the inner wall surfaces of the casing 26'. In this arrangement of the invention the protector 194 includes an outwardly flaring band member 196 having a closely fitted dust seal 198 adjacent one end of the band, the other end of which is partially closed by an annular end wall 200. The outward flare of the band member 196 affords an annular space 202 between the band member 196 and the adjacent outer surface of the casing 26' to provide for canting action of the band member 196 when a force is applied transverse thereto as denoted by arrow 204. Such force is applied, for example, when the casing 26' is dragged with one end thereof raised slightly as described previously. In this arrangement the band member 196 is fabricated from an elastomeric or other resilient material such that the band member 196 can be canted without interrupting contact between the sealing member 198 and the adjacent outer surface of the casing 26'. In furtherance of this purpose, the wall of the band member 196 can be thinned as denoted by reference characters 206 to provide a hinging action.

A cantable binding member 208 is secured to the annular end wall 200 of the protector 194 and is inserted into the hollow of the casing 26' when the band member 196 is fitted over the end of the casing 26'. In this arrangement the binding member 208 includes a discoidal end member 210 and a tubular stem 212, which is threadedly engaged in this example to the end wall 200 as denoted by reference character 214. The discoidal member 210 can be closely fitted within the casing 26' and is of sufficient thickness in the axial direction of the casing so that transverse displacement of the protector 194, for example in the direction denoted by arrow 204, causes the lower forward edge portion of the discoidal member 210 to forceably engage the adjacent surface of the casing as denoted by arrow 216, while the upper rear edge portion of the discoidal member forceably engages the adjacent wall surface of the casing in an axially displaced transverse plane as denoted by arrow 218. To increase the unit forces thus applied to the casing 26' when the protector 194 is canted as aforesaid the aforementioned edges are provided with circumferentially extending knife edge projections 220 and 222 respectively.

Depending upon the specific application of the protector 194, the binding member 208 is preferably fabricated from a relatively rigid structural material such as steel, aluminum, or a hard elastomeric of other plastic material such as hard rubber, reinforced fiber glass, or polyurethane of at least Shore D 60 hardness. On the other hand, it is contemplated that, the band member 196 be fabricated from a resilient or elastomeric material such as polyurethane of Shore D 60 hardness or less, or hard rubber.

To facilitate handling the protector 194, an eyebolt 224 is inserted through axial opening 226 within the binding member 208 and is secured by washers 228 and nut 230. Desirably, a conventional snap fastener 232 has its eye-end 234 permanently joined to the eye-bolt 224 leaving its snap end 236 free for temporarily joining the protector 196 to the aforementioned return wire. The snap fastener 232 also facilitates handling the protector by providing a handle extension, as it were.

Figure 15:
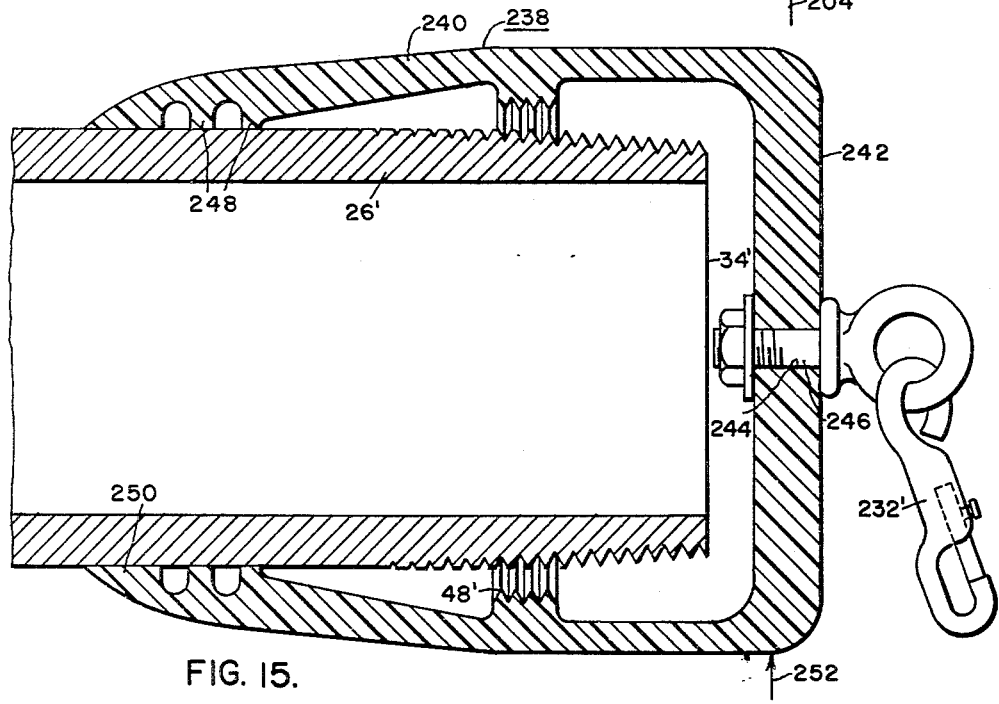
FIGURE 15 is a longitudinally sectioned view of still another form of a protector similar to that shown in FIGURES 9 and 10 but illustrating a modified arrangement of the handle and return wire engaging means.
Figure 16:
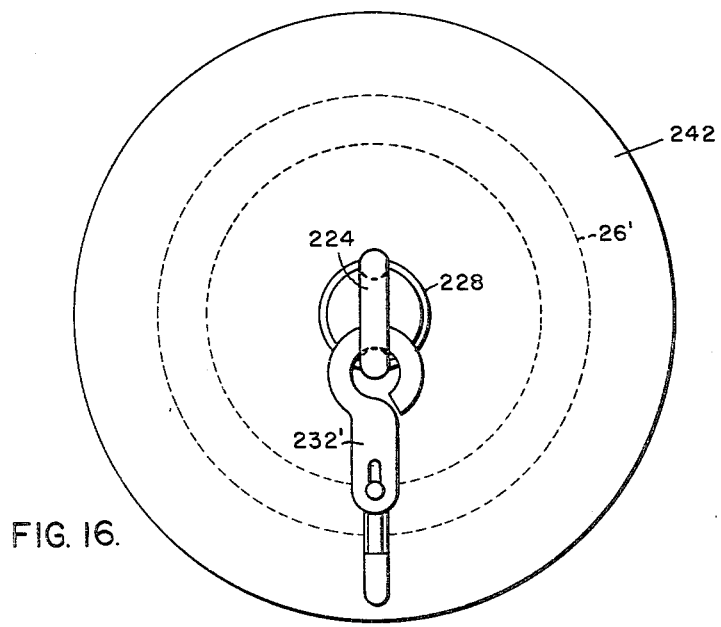
FIGURE 16 is an end elevational view of the protector as shown in FIGURE 15.

Referring now to FIGURES 15 and 16 of the drawings, still another form 238 of my novel protector is illustrated, which is generally similar to that shown in FIGURES 1-3 of the drawings. The protector 238 differs, however, in that band member 240 thereof is substantially closed at its outward end, with reference to its illustrated position on casing 26' by means of a discoidal end wall 242. The end wall 242 in this example is provided with a relatively small aperture 244 extending axially therethrough for securance of eye-bolt 246 to which is secured a snap fastener 232' for the purposes described in connection with FIGURE 14. In this arrangement of my invention the protector 238 is of one piece construction save for the eye-bolt 246 and snap fastener 232' which are of conventional and readily available form for replacement purposes. The protector 238 is thus generally similar in overall configuration to the thread protector 108 of FIGURES 9 and 10 with the exception that the binding members 248 are closely spaced and are disposed adjacent sealing member 250 at the forward end of the protector 238. This increases the mechanical advantage of the binding forces exerted upon the rings 248 and seal 250 by a transverse displacing force applied to end wall 242 as denoted by arrow 252, as when the casing 26' is dragged or upended.

The term "polyurethane elastomer" as used herein denotes a large number of resilient materials which are castable or moldable for purposes of this invention. In general, a polyurethane elastomer is produced from a combination of a polymeric isocyanate compound, such as a polyether, polyester, or polycaprolactone with an active amine or hydroxy compound. An active amine or hydroxy compound is one which is capable of yielding covalent hydrogen. It will be understood, of course, that other structural materials can be employed, as denoted previously depending upon the application of the invention. It is also to be understood that new resilient or elastomeric plastic materials are being developed almost daily, many of which will be suitable for fabricating the structures disclosed herein, as will be obvious to those schooled in this art.

The operational principles of my invention, as presently understood, are more fully explained with reference to FIGURE 17 of the drawings. In that figure the protector 20g is provided with a sealing ring 24', canting ring 42' and an outwardly flaring radially spaced wall member 253. The end 255 of the wall member extends rearwardly of the casing end 34' to protect such end and the adjacent threaded portion 30'. The use of a protector 20' having a fully open end 255 permits the last-mentioned protector to be installed anywhere along the length of the casing 26' as required. The protector 20g can be fabricated from a structurally rigid material such as steel or aluminum or from one of the elastomeric or resilient materials mentioned previously.

The fabricational material, however, is sufficiently rigid that application of force to the wall member 253, for example, adjacent the end 255 thereof as denoted by arrow 254 caused the protector 20' to tilt or cant about a fulcrum lying on transverse plane 256 defined in this example by circumferential groove 46' coextending between the sealing ring 24' and the canting ring 42'. In this specific arrangement the thickness of wall 253 in the area of the groove 46' is sufficient that relatively little displacement between sealing ring 24' and canting ring 42' occurs. Accordingly, each of the rings 24', 42' serve as canting rings.

As protector 20g pivots about a point on plane 256 under influence of transverse force 254 the upper portions of ring 24' are urged downwardly against the wall of the casing as denoted by arrow 258, while the lower portions of the ring 42' are urged upwardly as denoted by arrow 260. When the transverse pivoting force 254 is applied adjacent the end of the protector 20g as shown in FIGURE 17, the considerable mechanical advantage which is available is readily apparent from the propinquity of forces 258, 260 and the remoteness of force 254 relative to the fulcrum plane 256. This causes a considerable binding action of the protector upon the outer wall of the casing 26'. In addition application of the directional force 254 caused at least the upper portions of the rings 24', 42' to be displaced axially in this case in the direction denoted by arrow 262 to cause the rings to be canted upon the casing 26'. At the same time the lower portions of rings 24', 42' may be displaced in the opposite direction as denoted by arrow 264, since in most cases the actual fulcrum point will be at or near the intersection 266 of plane 256 and casing axis. Frictional forces will maintain the protector 20g in a canted position as denoted by line 270 thereof and bind the protector 20g on the casing 26' after the transverse force 254 is removed. However, the protector 20g can be readily removed by tapping the wall member 253 in the opposite direction to uncant and hence to unbind the protector.

Figure 17:
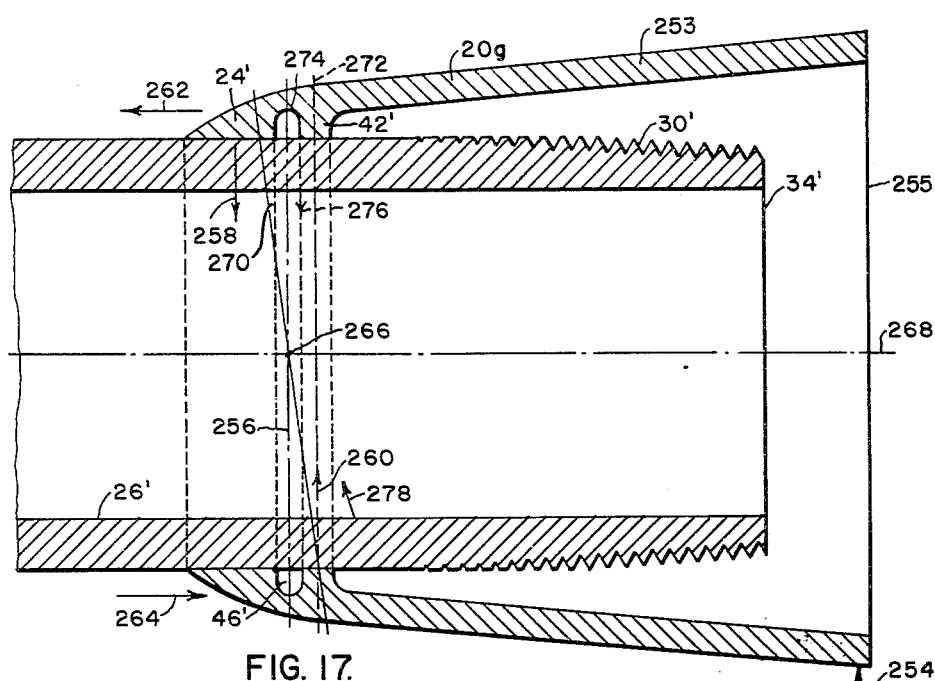
FIGURE 17 is a longitudinal sectional view of my protector and incorporating a force diagram for the purpose of explaining the operational principles of my invention in accordance with a present understanding thereof.

In the event that the sealing ring 24' is utilized merely for sealing purposes or is omitted altogether the fulcrum plane is shifted to the right, as viewed in FIGURE 17 and as indicated by dashed outline 272 thereof, and thus passes through the midsection of canting ring 42'. If the protector 20g is fabricated from an elastomeric material, at least partial elimination of the canting or binding action of sealing ring 24' can be effected by deepening groove 46' as denoted by chain outline 274 thereof, which imparts a hinging action to the wall member 253 in the area of the groove 274. In this alternative arrangement, the preponderant portion of the binding action is effected by the canting ring 42', which is similarly canted as denoted by arrows 262, 264. However, the left edge portion is caused to bind against the casing 26' in the upper regions of the ring 42' as denoted by arrow 276 while the right edge portion is caused similarly to bind in the lower regions of the ring 42' as denoted by arrow 278. This arrangement results in a still greater mechanical advantage when the transverse displacing force is applied to the protector 20g in the area denoted by arrow 254.

By the same token the unit frictional forces, which prevent removal of the protector 20g from its canted position, are increased.

Figure 18:
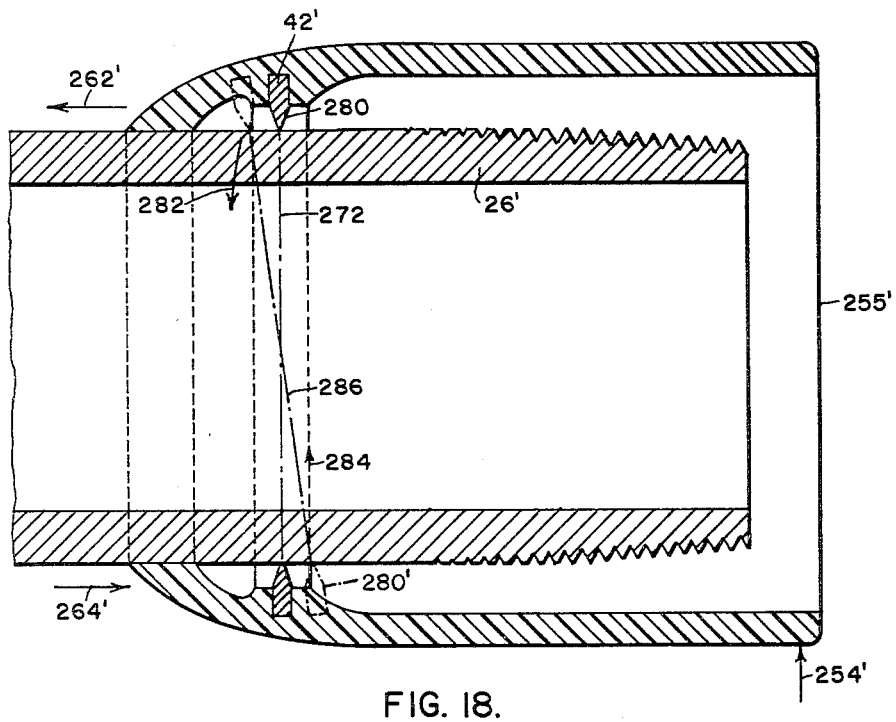
FIGURE 18 is a similar view of still another form of my protector.

A somewhat different mode of operation is encountered when the canting ring 42' is provided with a knife edge 280, as shown in FIGURE 18. In the latter arrangement fulcrum plane 272' is defined by the aforementioned knife edge. Application of transverse force 254' causes leftward and rightward displacements of upper and lower knife edge portions respectively, as denoted by arrows 262' and 264'. When the knife edge portions are thus displaced from the initial fulcrum plane 272', as denoted by chain outline 280' of the knife edge, upward and downward forces are applied to the casing 26', as denoted by arrows 282, 284. The amount of displacement, denoted by plane 286, is exaggerated for clarity, and the displacement will be less when employing a relatively rigid material such as mild steel for the knife edge 280. Accordingly, the mechanical advantage involved in the use of the knife edge 280 is very considerable, when the transverse force 254' is applied at or near the remote end 255' of the protector of FIGURE 18.

It will be readily apparent then that only a relatively light transverse load, when applied as in FIGURES 2–3, 17, or 18, is necessary to produce the binding action of my novel protector. In certain forms of my invention the weight of the protector itself, when at or near the horizontal position thereof, is sufficient to causing the protector to bind upon the casing or other cylindrical object on which it may be used. On the other hand the sealing ring 24 or 24' is usually sufficiently tight upon the casing 26' to hold the protector thereon when the protector is in an upright, uncanted position.

From the foregoing it will be apparent that novel and efficient forms of my protector have been disclosed herein. The protector is arranged for quick and easy installation and removal and in most cases can be fabricated as a one-piece construction from a number of widely varying materials. For many applications one of the aforementioned polyurethane materials are advantageously used for molding or casting the protector. Thus, the protector can be fabricated with a minimum of component parts, and there are no moving parts which must be manipulated by operating personnel for either opening or closing the protector. Rather, the protector is bound or locked upon the casting section by the normal application of loads thereto. Therefore, there is no external hardware attached to the protector which can cause injury to operating personnel or which is readily subject to breakage or malfunction.

It will be understood, of course, that features of certain forms of my protector can be utilized on other forms thereof although not so illustrated in the drawings. For example, the handle end wall and the notch member of FIGURES 9 and 10 or the handle end wall and snap fastener of FIGURES 15 and 16 can be applied to the protector illustrated in any of the preceding figures. Similarly, the composite band members of FIGURES 4 and 5 or the reinforcing washers of FIGURES 7A and 7B can be applied where appropriate to the protectors of the remaining figures. It is also contemplated that the end lip or end wall of appropriate figures can be omitted and that the protectors of such figures and other figures can be installed intermediate the end portions of the casing, pipe, or other cylindrical object to protect the adjacent surface of the object or to space the object from other items in its environment.

While I have shown and described certain presently preferred embodiments of the invention and have illustrated presently preferred methods of practicing the same it is to be distinctly understood that the invention is not limited thereto but may be otherwise variously embodied and practiced.

I claim:
1. A protector for a casing and the like, said protector comprising ring means shaped for closely fitted engagement with said casing, a protective member spaced radially and outwardly from said casing and extending therealong to a point axially displaced from said ring means, said ring means spacing the adjacent portion of said protective member from said casing so that radially displacing forces applied to said protective member at a point removed from said ring means apply canting forces to said ring means to cause said ring means to bind upon said casing.

2. The combination according to claim 1, including an annular wall member joined to said protective member at the end thereof removed from said ring means, said wall member being disposed to protect an adjacent end of said casing.

3. The combination according to claim 1 including a discoidal wall member joined to that end of said protective means which is removed from said ring member, and handle means are secured to the wall member.

4. The combination according to claim 1 wherein said protector includes a closely fitting sealing ring secured in spaced relationship to said ring means on the side away from said protective member, and means are provided for resiliently joining said sealing ring to said ring means to permit relative displacement between said sealing ring and said ring means when said protective member and said ring means are canted.

5. The combination according to claim 1 wherein said protector includes a loosely fitted dust shield spacedly mounted adjacent said ring means, and means are provided for rigidly joining said dust shield to said ring means.

6. The combination according to claim 1 wherein said ring member and said protective means are integrally cast from a polyurethane elastomeric material.

7. The combination according to claim 1 wherein said object is a tubular member, and said protective member includes a transversely extending end wall portion on which said ring means is mounted for closely fitted insertion into the hollow of said tubular means, said ring means having sufficient axial thickness so that canting of said protective member causes opposite and axially displaced edges of said ring means to forceably engage and bind against respectively adjacent inner wall surfaces of said tubular member.

8. The combination according to claim 1 including a collapsible collar joined to that end of said protective member which is displaced from said ring means to protect the adjacent portions of said object.

9. The combination according to claim 1 wherein said protector includes second canting ring means spacedly joined to said first-mentioned ring means.

10. The combination according to claim 1 wherein the periphery of said protective member is provided with means for frictionally engaging the adjacent wall surfaces of said object in the area of application of said forces when said forces are applied.

11. A protector for a casing and the like, said protector comprising a continuous resilient band member, a sealing member secured to said band member for engaging said casing, a circumferentially extending casing end protective member secured to said band member and positioned adjacent one end of said casing when said band member is slipped thereover, said band member being spaced from the adjacent outer surfaces of said casing to permit angular displacement of said band member with respect to the axis of said casing upon the application of transverse loads thereto, said angular displacement applying canting forces to said sealing member to secure said protector on said casing.

12. The combination according to claim 10 wherein said frictional means include the provision of a relatively soft elastomeric material on the inner periphery of said protective member.

13. The combination according to claim 11 wherein said protector is shaped for application over a threaded end of said object, and said frictional means are thread engaging means including at least one inwardly extending circumferential projection secured to the inner periphery of the band member adjacent said threads.

14. The combination according to claim 11 wherein said end protective member is provided with a relatively shallow peripherally extending recess disposed inwardly of said band member into which the end of said casing is seated as said casing is being raised to its vertical position.

15. The combination according to claim 1 wherein said ring means is a relatively thin cantable washer confined in a washer receiving recess extending circumferentially in said protective member, the inner periphery of said washer being closely fitted about the outer wall surface of said object when said band member is placed thereon, said washer being fabricated from a relatively hard structural material to produce a binding and locking action upon said casing when transverse forces are applied to said thread protector, and said washer recess is of sufficient width to permit canting of said washer.

16. The combination according to claim 15 wherein a pair of generally opposed circumferential lugs are formed on said protective member and are disposed adjacent said washer recess, said lugs engaging the sides respectively of said washer and being fabricated from a material which is sufficiently resilient to permit canting of said washer thereagainst when transverse loads are applied to said protective member and to return said washer to its normal uncanted position when said loads are removed from said protective member.

17. The combination according to claim 1 wherein said protective member is of composite construction having an outer sleeve fabricated from a relatively hard structural material and an inner sleeve juxtaposable to a threaded portion of said object and fabricated from an elastomeric material, and a flexible sealing band having a lateral edge joined to the adjacent lateral edge of said outer sleeve in continuation of said protective member, the free lateral edge of said flexible sealing band being relatively closely fitted about said casing when said protector is placed thereon said sealing band providing a circumferential hinge and thereby permitting cocking of said outer and inner shells to frictionally engage said inner shell with said threads.

18. The combination according to claim 17 wherein said inner and outer shells include circumferentially and transversely extending protective members secured respectively thereto adjacent the other lateral edge of said outer shell for protecting an adjacent end of said object.

19. The combination according to claim 17 wherein a locking washer is secured to said flexible sealing band and to said outer shell at the junction therebetween, the inner periphery of said locking washer relatively closely fitting an adjacent outer wall surface of said object when inserted into said protector so that canting of said outer shell cants the washer against said wall surface to bind said protector on said object.

20. The combination according to claim 3 wherein said handle member extends centrally of said wall member and outwardly of said protector, and quick-attach wire return engaging means are secured to said handle member, for attaching said protector to said return wire.

21. The combination according to claim 1 wherein said ring member is additionally shaped for closely fitting engagement with the exterior of said casing.

22. The combination according to claim 1 wherein said ring member is additionally shaped for closely fitting engagement with the interior of said casing.

References Cited

UNITED STATES PATENTS

| | | | |
|---|---|---|---|
| 938,793 | 11/1909 | Schraudenbach | 138—96 XR |
| 1,756,167 | 4/1930 | Avery. | |
| 1,934,681 | 11/1933 | Damsel | 138—96 |
| 2,989,087 | 6/1961 | Higgins | 138—96 |
| 3,038,502 | 6/1962 | Hauk et al. | |
| 3,160,175 | 12/1964 | Laemmle | 138—96 |

FOREIGN PATENTS 662,591 7/1938 Germany.

H. HAMPTON HUNTER, Primary Examiner

U.S. Cl. X.R.

285—45; 16—108

UNITED STATES PATENT OFFICE
CERTIFICATE OF CORRECTION

Patent No. 3,485,271                         December 23, 1969

George H. Halsey

It is certified that error appears in the above identified patent and that said Letters Patent are hereby corrected as shown below:

Column 1, line 25, "or" should read -- of --. Column 6, line 9, "20b" should read -- 20c --. Column 15, line 20, "band" should read -- protective --.

Signed and sealed this 3rd day of November 1970.

(SEAL)
Attest:

Edward M. Fletcher, Jr.                 WILLIAM E. SCHUYLER, JR.
Attesting Officer                            Commissioner of Patents